No. 755,010. PATENTED MAR. 22, 1904.
C. C. IRVING.
BEET HARVESTING MACHINE.
APPLICATION FILED JUNE 1, 1903.
NO MODEL. 3 SHEETS—SHEET 1.
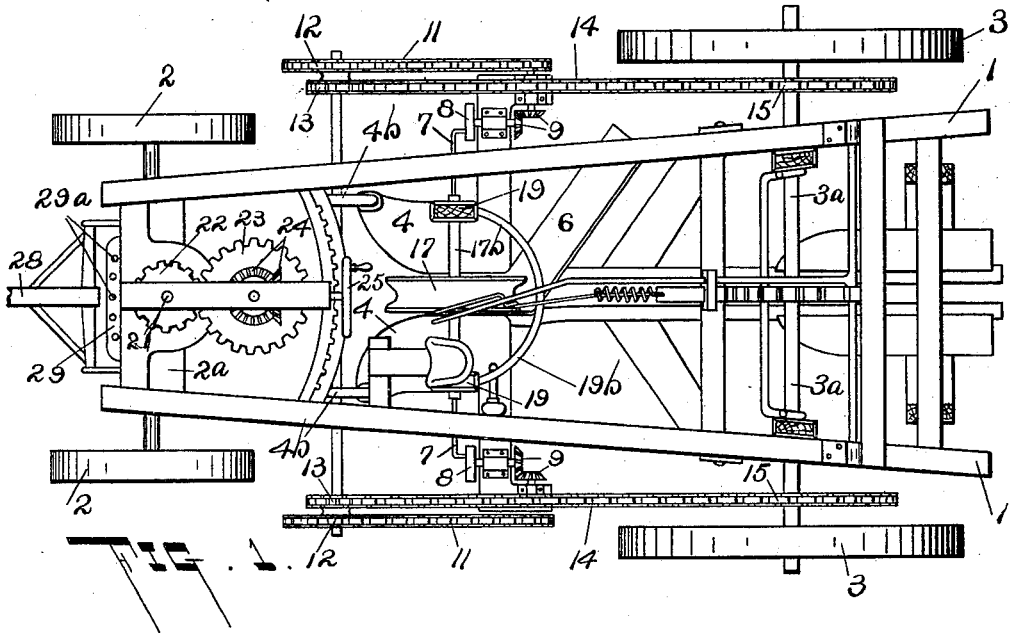
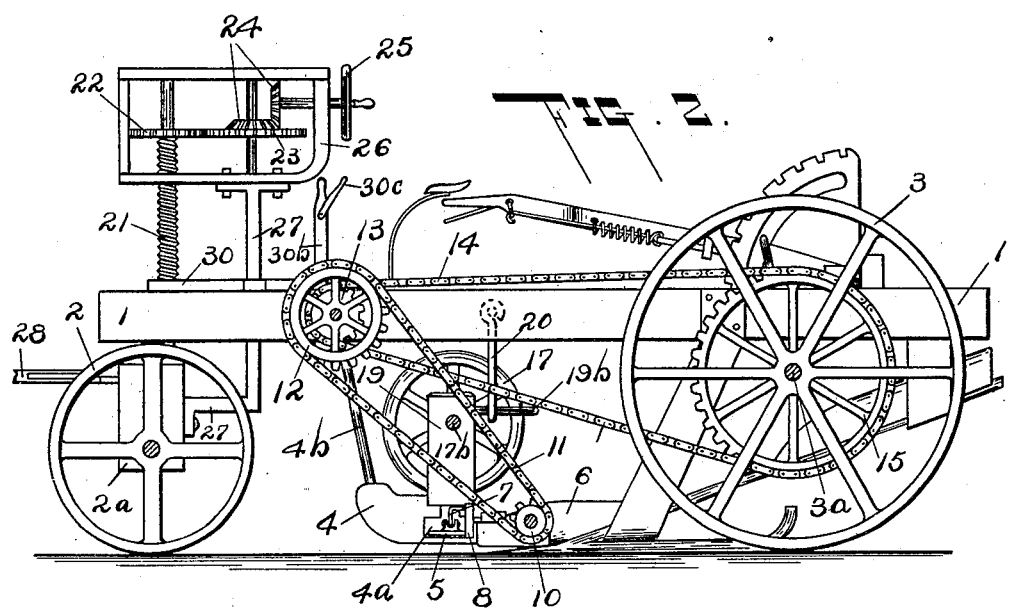
WITNESSES:
James C. Hanson.
P. M. Holdsworth.
Charles C. Irving. INVENTOR
BY
Geo. B. Willcox ATTORNEY No. 755,010. PATENTED MAR. 22, 1904.
C. C. IRVING.
BEET HARVESTING MACHINE.
APPLICATION FILED JUNE 1, 1903.
NO MODEL. 3 SHEETS—SHEET 2.
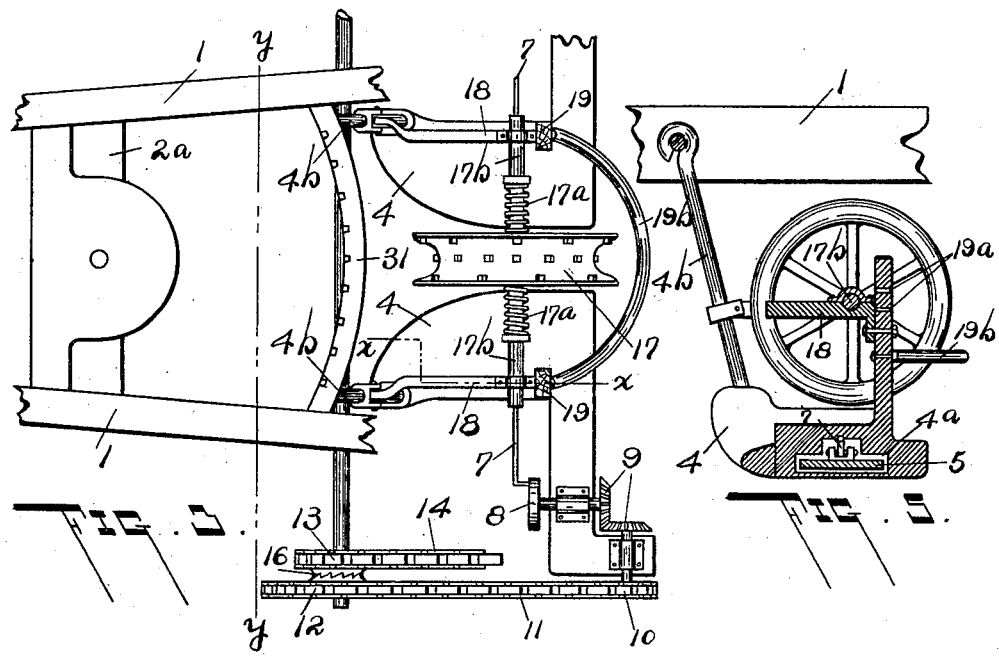
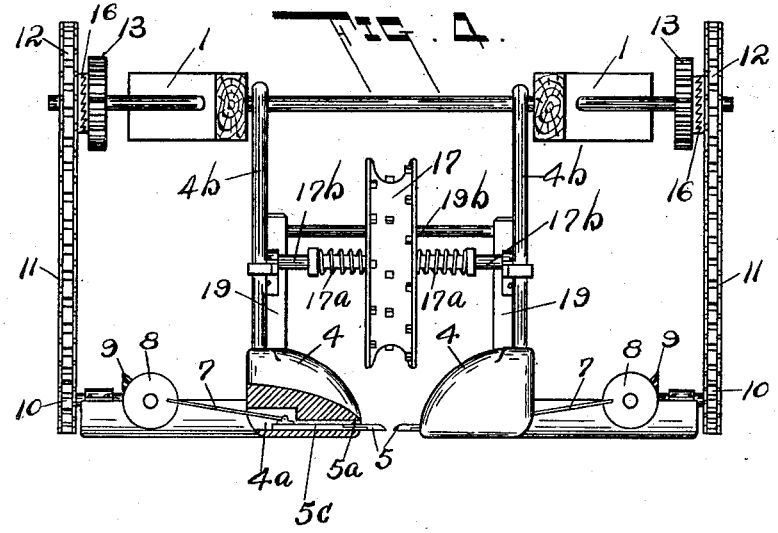
WITNESSES:
James C. Hanson.
P. M. Holdsworth.
Charles C. Irving. INVENTOR.
BY
Geo. B. Willcox, ATTORNEY.

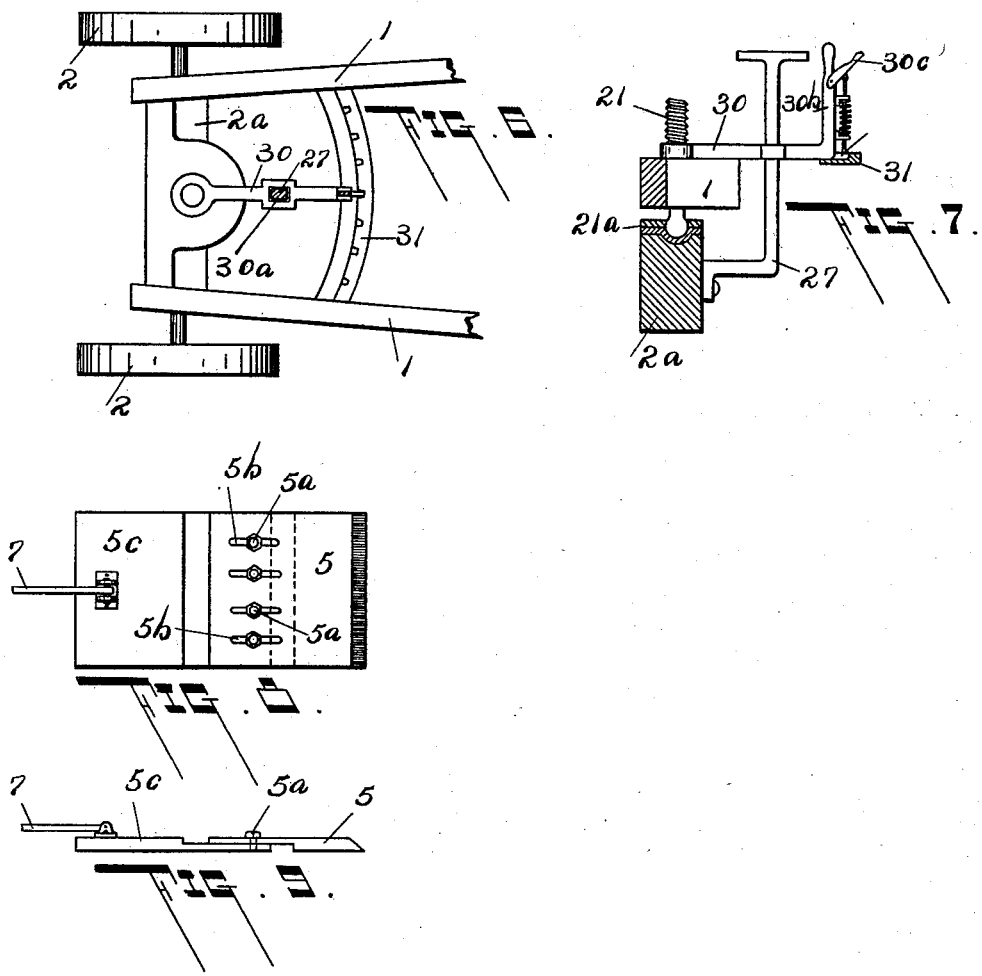

No. 755,010.

Patented March 22, 1904.

UNITED STATES PATENT OFFICE.

CHARLES C. IRVING, OF ESSEXVILLE, MICHIGAN.

BEET-HARVESTING MACHINE.

SPECIFICATION forming part of Letters Patent No. 755,010, dated March 22, 1904.

Application filed June 1, 1903. Serial No. 159,630. (No model.)

*To all whom it may concern:*

Be it known that I, CHARLES C. IRVING, a citizen of the United States, residing at Essexville, in the county of Bay and State of Michigan, have invented certain new and useful Improvements in Beet-Harvesting Machines; and I do hereby declare the following to be a full, clear, and exact description of the invention, such as will enable others skilled in the art to which it appertains to make and use the same.

This invention is a beet-harvesting machine; and the objects of the invention are to provide a topping device which will cut the tops off clean without breaking the body of the beets, to make the topping device automatically adjustable to accommodate irregularities in the rows and in the heights of the beets above the ground, to provide means for lifting the frame and machinery to different heights above the ground, and means for sluing the machine to bring the beets centrally into the topping mechanism and to aid in steering the machine over rough and hilly ground.

The machine is illustrated in the accompanying drawings, in which—

Figure 1 is a top plan view, and Fig. 2 is a side elevation, of the machine complete. Fig. 3 is a top plan view with parts broken away of the topping machinery. Fig. 4 is a front elevation, partly in section, of the same, the section being taken on the line $y\ y$ of Fig. 3. Fig. 5 is a side elevation, partly in section, of the topping device, the section being taken on the line $x\ x$ of Fig. 3. Figs. 6 and 7 are detail views of the steering mechanism. Figs. 8 and 9 are details of the topping-knives.

As is shown in the drawings, the machine comprises a rigid supporting-frame 1, mounted on steering-wheels 2 at the forward end and driving-wheels 3 at the rear end.

The construction and operation of the topping mechanism are as follows:

A pair of shoes 4, pivotally suspended from the frame by rods $4^b$, are arranged to travel just above the surface of the ground, one on each side of the row of beets, gathering together the spreading tops of the beets and lifting them clear of the ground. Each shoe has a horizontal slot $4^a$, in which vibrates a reciprocating blade 5. These blades move back and forth simultaneously and meet centrally between the shoes 4, severing the tops of the beets, which pass backward and are discharged at one side by a trough 6. Various means could be devised for reciprocating the knives 5; but I prefer the means shown in the drawings, comprising connecting-rods 7, driven by crank-wheels 8, which are driven by the bevel-gears 9, sprocket-wheels 10, chains 11, sprocket-wheels 12 and 13, chains 14, and sprocket-wheels 15 from the main driving-axle $3^a$. A clutch 16 is provided between the sprocket-wheels 12 and 13, so that the knives can be stopped, if desired. The knives 5 are preferably made adjustable, as shown in Figs. 8 and 9, by securing them with bolts $5^a$ through slotted holes $5^b$ to plate $5^c$.

A gage-wheel 17, adapted to roll over the tops of the beets and lift the shoes 4 and knives 5 to cut off the right amount of the body of the beet with the top, is mounted above and midway between the shoes 4. It is held centrally between the shoes by springs $17^a$, which will, however, yield and allow the wheel to move either way to accommodate irregularity in the rows.

In Figs. 3, 4, and 5 I have shown a means for adjusting the height of the wheel 17 above the knives 5. It comprises a shaft $17^b$, supported at each end upon bars 18, which are pivotally secured at their front ends to the rods $4^b$ and are secured at their rear ends to the vertical standards 19 by means of bolts through any of the holes $19^a$. A hook 20, secured to the frame 1, is adapted to catch the cross-brace $19^b$, secured to the standards 19, and prevent the topping mechanism from going lower than a certain point and also to keep the mechanism clear of the ground when the forward end is raised. The forward end of the frame is adjustable in height by means of the screw 21, threaded through the forward end of the frame 1 and having a suitable bearing $21^a$ on the bolster $2^a$ of the steering-wheels 2. To make the screw more easily operated, it is provided at its upper end with a gear-wheel 22, meshing with a larger gear-wheel 23, which may be rotated in either direction by means of the bevel-gear 24 and hand-wheel 25. All of these gears are mounted on a suitable yoke 26, rigidly secured to the bolster 2ª by the frame 27.

The steering of the machine on even ground may be accomplished by means of the tongue 28; but on hilly or uneven ground the tongue may be detached and the horses hitched to the machine by means of the holes 29ª in the clevis 29. The steering may then be accomplished by the driver by means of the following device, which is clearly illustrated in Figs. 6 and 7. A horizontal bar 30, secured to the frame 1 and turning about the same center as the screw 21, is formed with a hole 30ª, through which the upright frame 27 may slide freely. The rear end of the bar 30 moves over the horizontal notched quadrant 31 and is provided with an upwardly-turned handle 30ᵇ and a latch 30ᶜ, secured thereto and adapted to engage the quadrant 31. By this device the machine may be guided to keep the topping mechanism central with the rows of beets.

This topping mechanism may be followed by any approved form of digging mechanism secured to the frame 1.

By the means described I have produced a beet-harvester which when drawn along the rows of beets removes the tops at the right point without breaking the body of the beet by means of a device which accommodates itself to irregularities in the rows and the heights of the beets above the ground. Moreover, the driver has within easy reach a steering-gear by which the machine can be directed so as to bring the beets centrally between the slots of the topping mechanism.

What I claim as my invention, and desire to secure by Letters Patent, is as follows:

1. A beet-harvesting machine comprising in combination a supporting-frame mounted on wheels; a topping device comprising a pair of slightly-separated shoes pivotally suspended below the frame, a pair of horizontal reciprocating knives, one carried by each shoe, said knives being adapted to meet centrally between the shoes, means operated by the wheels for imparting a reciprocating motion to said knives, a gage-wheel secured to the shoes revolubly mounted above and centrally between them, and a deflecting-trough in the rear of said shoes; together with means for limiting the position of the topping mechanism below the frame; means for raising the forward end of the frame; and means for guiding the machine to bring the beets centrally between the shoes.

2. In a beet-harvesting machine, a topping device comprising a pair of pivotally-suspended slightly-separated shoes; a pair of horizontal reciprocating knives carried by said shoes, and arranged to meet centrally between the shoes; means for imparting a reciprocating motion to said knives; a deflecting-trough in the rear of said shoes, and a revolubly-mounted gage-wheel secured to the shoes above and centrally between them.

3. In a beet-harvesting machine a topping device comprising a pair of pivotally-suspended slightly-separated shoes; a pair of horizontal reciprocating knives carried one by each shoe, and arranged to meet centrally between the shoes; means for imparting a simultaneously opposite reciprocating motion to said knives; a deflecting-trough in the rear of the shoes; and a gage-wheel secured to these shoes, being revolubly mounted above them and yieldingly held centrally between them; and means for adjusting the height of said gage-wheel above the shoes.

In testimony whereof I affix my signature in presence of two witnesses.

CHARLES C. IRVING.

Witnesses:
P. M. HOLDSWORTH,
JAMES C. HANSON.